(12) United States Patent
Tokugawa et al.

(10) Patent No.: US 6,294,899 B1
(45) Date of Patent: Sep. 25, 2001

(54) CONTROL SYSTEM FOR AN ALTERNATING CURRENT GENERATOR

(75) Inventors: Kazuya Tokugawa; Shiro Iwatani, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,117

(22) Filed: Feb. 14, 2000

(30) Foreign Application Priority Data

Aug. 30, 1999 (JP) .................................................. 11-243972

(51) Int. Cl.⁷ ...................................................... H02P 9/14
(52) U.S. Cl. ................................................. 322/28; 322/37
(58) Field of Search .............................. 322/25, 27, 28, 322/36, 37

(56) References Cited

U.S. PATENT DOCUMENTS

| | | | | |
|---|---|---|---|---|
| 3,852,653 | * | 12/1974 | Kuroda et al. | 320/64 |
| 4,623,833 | * | 11/1986 | Edwards | 322/28 |
| 4,629,968 | * | 12/1986 | Butts et al. | 322/29 |
| 5,061,889 | * | 10/1991 | Iwatani et al. | 322/28 |
| 5,157,321 | * | 10/1992 | Kato et al. | 322/28 |
| 5,254,935 | * | 10/1993 | Vercesi et al. | 322/29 |
| 5,982,155 | * | 11/1999 | Rechdan et al. | 322/36 |
| 6,060,866 | * | 5/2000 | Sada et al. | 322/59 |
| 6,204,643 | * | 3/2001 | Kouwa et al. | 322/28 |
| 6,215,284 | * | 4/2001 | Komurasaki et al. | 322/25 |

FOREIGN PATENT DOCUMENTS 2579812  11/1996  (JP) .................................. H02P/9/14

* cited by examiner

Primary Examiner—Nicholas Ponomarenko
(74) Attorney, Agent, or Firm—Sughrue, Mion, Zinn, Macpeak & Seas, PLLC

(57) ABSTRACT

In order to make the output voltage of the alternating current generator to be controllable even when a malfunction is produced on the negative electrode side of the magnetic field coil, the voltage control circuit for controlling the output voltage of the alternating current generator is provided on the negative electrode side of the magnetic field coil of the alternating current generator for charging a battery and, on the positive electrode side of the same, the overvoltage protection circuit for controlling the output voltage of the alternating current generator is provided.

10 Claims, 4 Drawing Sheets

CONTROL SYSTEM FOR AN ALTERNATING CURRENT GENERATOR

BACKGROUND OF THE INVENTION

1. Field of the Invention

The present invention relates to a control system of an alternating current generator for charging battery for controlling output voltage of that generator so that the voltage becomes to a voltage of a predetermine valve.

2. Description of the Prior Art

FIG. 4 shows a circuit of a control system of a conventional alternating current generator, and this shows a circuit in the case where it is employed in an alternating current generator being used for vehicle.

1 is an alternating current generator comprising three generator coils 101 and a magnetic field coil 102. 2 is a full wave rectifier for rectifying output of the generator coils 101 and consisting of six diodes and having an output terminal 201 on the positive electrode side and a grounded output terminal 202 on the negative electrode side.

3 is a voltage control circuit being connected in series to the negative electrode side of the magnetic field coil 102 and this control circuit consists of a constant voltage power supply A, which consists of a resistance 301 for limiting electric current and a zener diode 302 for fixing voltage to a fixed one, potential dividing resisters 303 and 304 for detection of the output voltage of the generator 1, a comparator 305 for comparing the detection voltages appearing through the potential dividing resistances 303 and 304 with the predetermined voltage Ref1, a power transistor 308 serving as a first power transistor, resistance 306 for supplying base current and a suppression diode 307 for absorbing surge voltage of the magnetic field coil.

4 is a battery whose negative side is grounded and whose positive side is connected to one end of a key switch 5, to one end of the resistance 303, to cathode of the diode 307, to positive electrode side of the magnetic field coil 102 and to the output terminal 201 on the positive electrode side of the full wave rectifier 2.

The predetermined voltage Ref1 serving as a first predetermined value is supplied by dividing the output voltage of the constant voltage power supply A by means of unshown resistors, and in this case, and this divided voltage is set to about 14.5V as a threshold voltage for switching output voltage of the comparator 305 to "High" or "low".

Detailed description on the constitution of the voltage control circuit 3 will be given subsequently. One end of the resistance 301 is connected to another end of the key switch 5 and to one end of the resistance 306, and another end of the resistance 301 is connected to the cathode of the zener diode 302 and becomes to a feeding terminal of the constant voltage power supply A. Anode of the zener diode 302 is grounded. One end of the resistance 303 is connected to the positive electrode side of the battery 4 and its another end is connected to one end of the resistance 304 whose another end is grounded. A portion between the resistances 303 and 304 is connected to the negative input electrode of the comparator 305. The predetermined voltage Ref1 is supplied to the positive electrode side of the comparator 305. The output terminal of the comparator 305 is connected to the another end of the resistance 306 and to the base of the power transistor 308. Collector of the power transistor 308 is connected to the anode of the suppression diode 307 and to the side of the negative electrode of the magnetic field coil 102 and its emitter is grounded.

Subsequently, operation of the control circuit will be described. When a driver turns on the key switch 5, a predetermined voltage is generated at the constant voltage power supply A by the electric current flowing through the resistance 301 and the zener diode 302 resulting in generation of a predetermined voltage at the constant voltage power supply A, and thus supplied predetermined voltage Ref1 is input to the comparator 305. At this time, because the generator 1 has not yet generated electricity, the output voltage of the battery 4 detected through the resistances 303 and 304 is lower than the predetermined constant voltage Ref1. Accordingly, output of the comparator 305 becomes "High" and in turn the transistor 308 is turned on and thus the magnetic field current flows trough the magnetic field coil 102 caused by turning on the transistor 308.

By turning on the starting switch (unshown) thereafter, the engine is started and the alternating current generator 1 starts the alternating current generation. Output of alternating current generator 1 is rectified by the full wave rectifier 2 and the battery is charged.

At this time, when the output voltage of the alternating current generator 1 is lower than the predetermined voltage Ref1, this lower voltage is detected through resisters 303 and 304 for potential division, and the output of comparator 305 becomes "High" and the power transistor 308 becomes conductive and thus the current flowing through the magnetic field coil 102 is increased resulting in rising up of the output voltage of the generator 1. When this output voltage exceeds the predetermined voltage Ref1, operation contrary to the aforementioned is carried on. In other words, output of the comparator 305 becomes "Low" and the power transistor 308 is shut off and this causes reduction of the magnetic field current of the magnetic field coil 102 and in turn the output voltage of the alternating current generator 1 decreases.

After that, by repetition of the above mentioned operations, the control circuit controls the output voltage of the alternating current generator 1 so that it maintains a predetermined value. In this case, the magnetic field current to the magnetic field coil 102 is controlled by turning on and turning off it so as to enabling the battery 4 to maintain its voltage to the predetermined voltage Ref1 of 14.5V.

However, in the aforementioned conventional system, suppose should a trouble is developed such that the power transistor 308 is shorted or the negative side of the magnetic field coil 102 is grounded by an extraneous metal and the like, the voltage control circuit 3 is obliged to be bypassed and this makes the magnetic field current of the magnetic field coil 102 to be uncontrollable and as a consequence the maximum magnetic field current is to flow through the magnetic field coil 102; in turn the output voltage of the alternating current generator 1 rises unusually to an over voltage and this over voltage inevitably destroys electric loads (unshown) on board the vehicle. Further, due to this over voltage, there was a possibility of destroying devices being necessary for vehicle running and thus the vehicle will be able to run no longer.

A control system with a function of displaying overvoltage of a battery 4 disclosed in the Japanese Patent Publication No. 2579812 is known; but this system has no ability of recovery from the overvoltage at the time when the battery 4 becomes to be over voltage and further has no ability of continuing the battery charging and electricity supply to the electric loads because of stoppage of the generation of electricity.

The present invention has been made in order to solve the forgoing problems, and the object of the invention is to control, even when a malfunction is developed on the negative electrode side of the magnetic field coil, the output voltage of the alternating current generator is controlled so that the operation of charging battery and that of supplying electricity to the electric loads can be continued.

SUMMARY OF THE INVENTIONS

According to the invention as recited in claim 1, an overvoltage protection circuit for controlling output voltage of the alternating current generator is provided on the positive electrode side of the magnetic field coil.

According the invention as recited in claim 2, the voltage control circuit comprises a first power transistor being connected in series with the magnetic field coil on the negative electrode side of said magnetic field coil and for controlling magnetic field current of the magnetic field coil by turning on and turning off the same, and the voltage control circuit controls the first power transistor by detecting the output voltage of the alternating current generator, thereby controls the output voltage of the alternating current generator to a first predetermined value which is the normal value of the output voltage.

According to the invention as recited in claim 3, the overvoltage protection circuit comprises a second power transistor being connected in series with the magnetic field coil on its positive electrode side for controlling magnetic field current of the magnetic field coil by turning on and turning off the current, a first voltage control section which works so as to control the output voltage to a second predetermined value by controlling the second power transistor through detection of the output voltage of the alternating current generator, and a second voltage control section which works so as to shut off the second power transistor when the output voltage exceeds a third value being set higher than the first and second values.

According to the invention as recited in claim 4, the overvoltage protection circuit turns on an overvoltage warning lamp when the second voltage control section is operated caused by the output voltage of the alternating current generator exceeding over the third predetermined value.

According to the invention as recited in claim 5, the voltage control circuit is installed within body of the alternating current generator.

According to the invention as recited in claim 6, the overvoltage protection circuit is installed within body of the alternating current generator.

According to the invention as recited in claim 7, the voltage control circuit is arranged to be formed to a separated body from the alternating current generator.

According to the invention as recited in claim 8, the overvoltage protection circuit is arranged to be formed to a separated body from the alternating current generator.

According to the invention as recited in claim 9, the second predetermined value is the same with the first predetermined value.

According to the invention as recited in claim 10, the third predetermined value is set higher by 1.8V for battery of 12V grade with respect to the first predetermined value and is set higher by 4.5V for battery of 24V grade with respect to the same.

BRIEF DESCRIPTION OF THE ACCOMPANYING DRAWINGS

FIG. 1 is a circuit diagram for the control system of the alternating current generator according to the invention as recited in claim 1.

FIG. 2 a schematic diagram for illustrating the voltage control package and the overvoltage package according to Embodiment 1.

DETAILED DESCRIPTION OF THE PREFERRED EMBODIMENTS

Subsequently, description on the preferred embodiments of the present invention will be given Embodiment 1.

Figure 1:
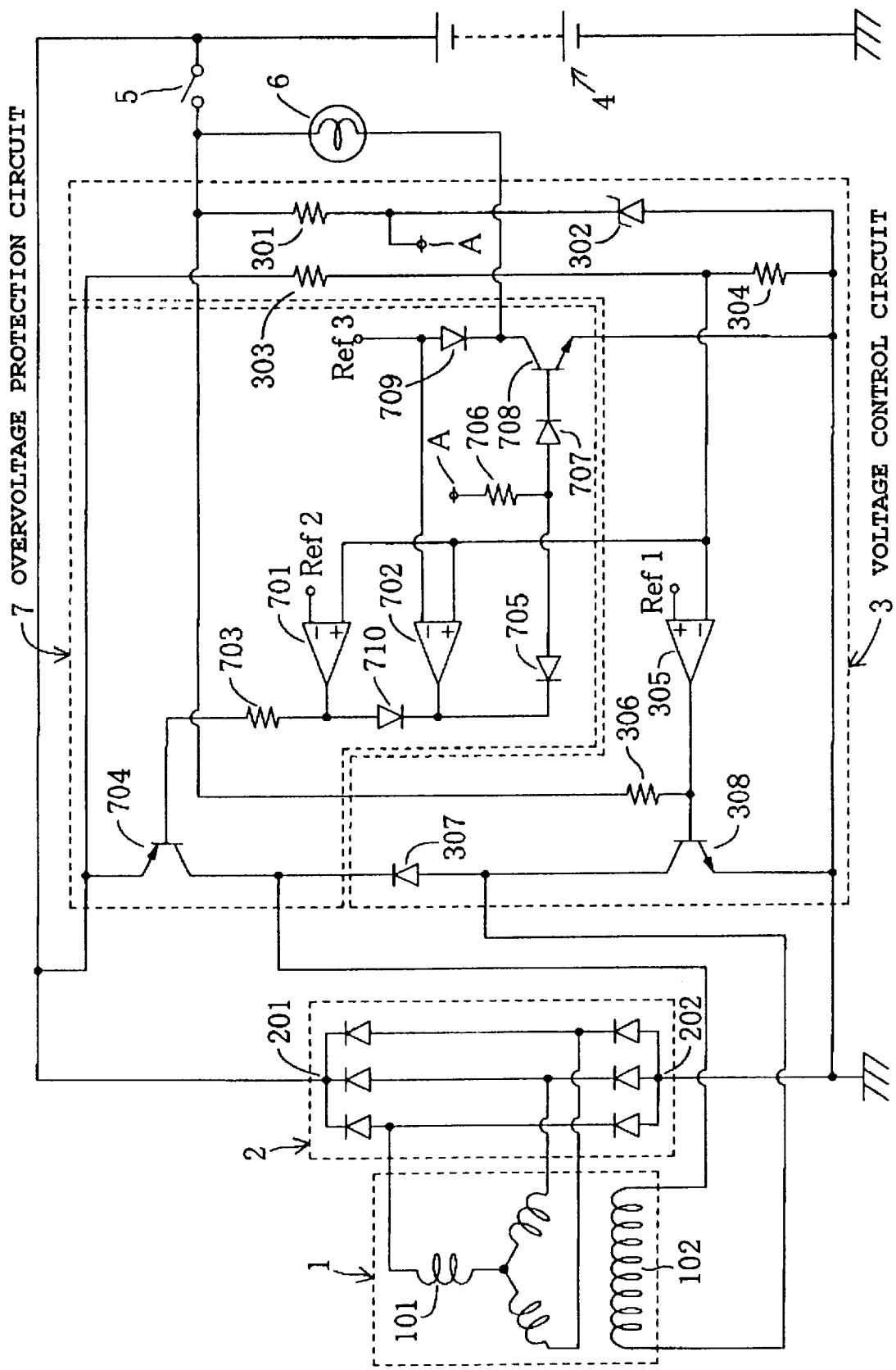
Figure 2:
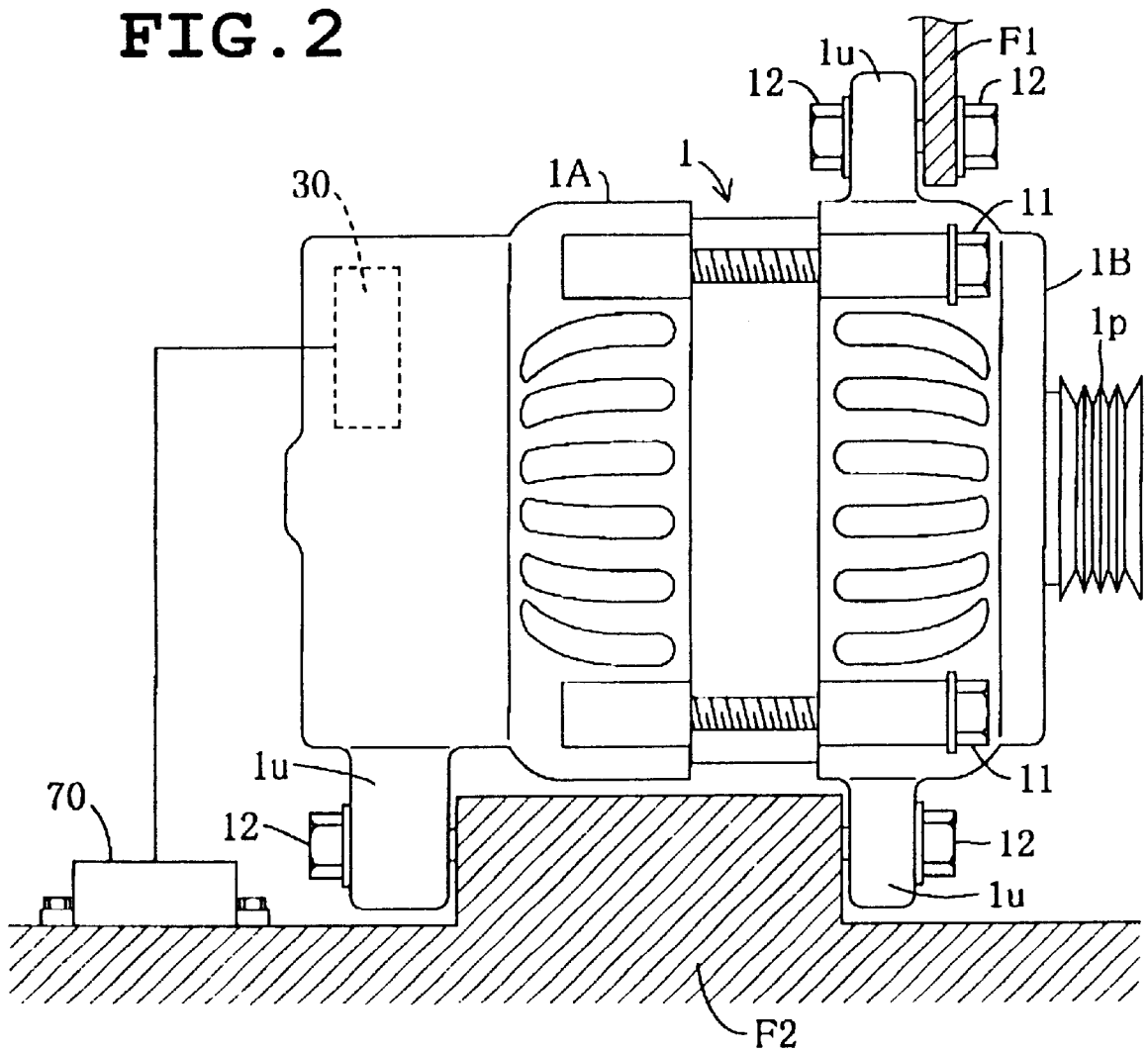
Figure 4:
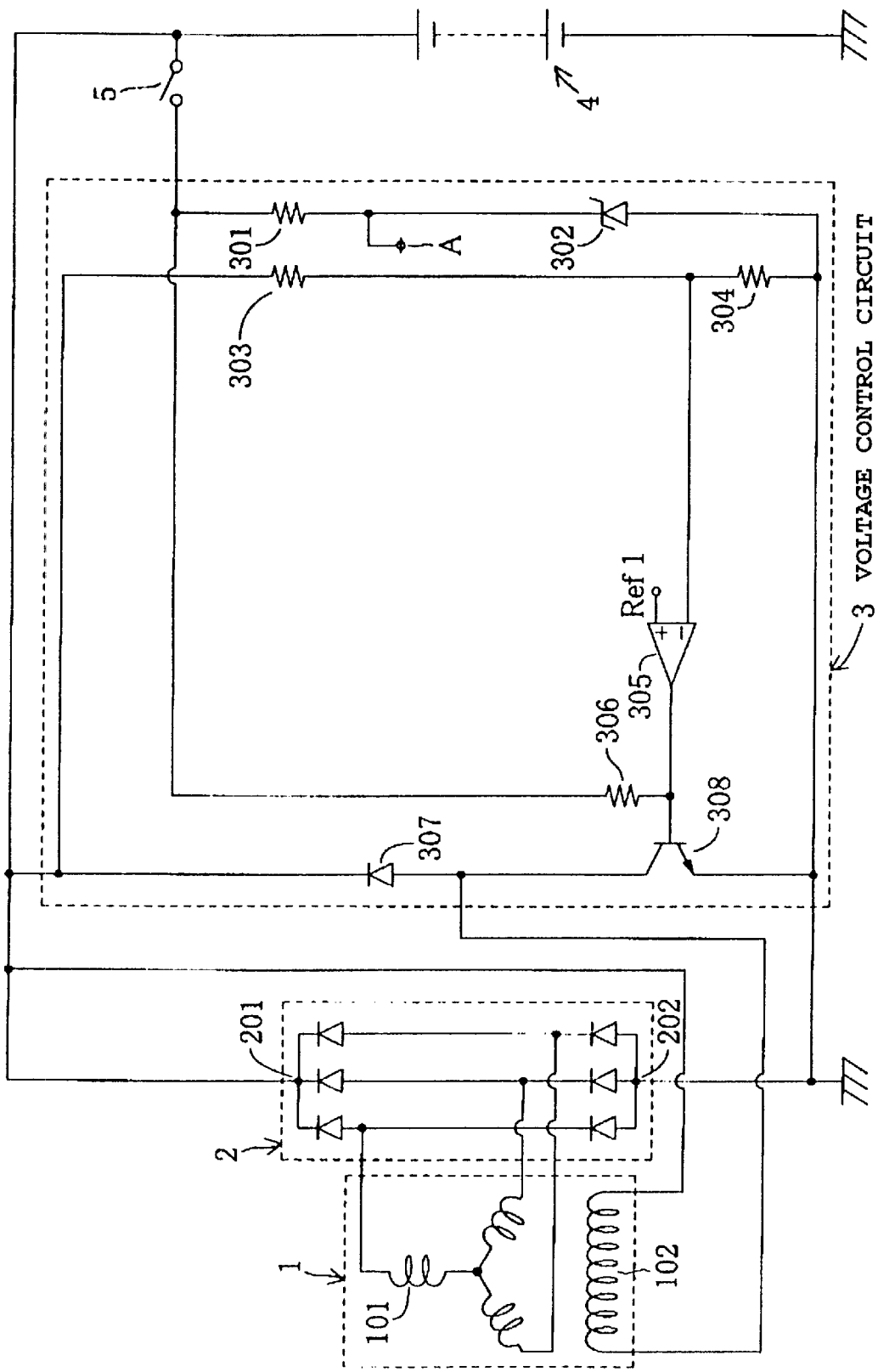
FIG. 4 is a circuit diagram for conventional control system of an alternating current generator.

FIG. 1 shows a circuit in the case where the control system according to the Embodiment 1 is used for the alternating current generator being used for a vehicle, FIG. 2 shows an outline of construction for attachment of the voltage control circuit and the over voltage protection circuit, and uses the same symbols as those in FIG. 4 as far as they are the same.

In FIGS. 1, 6 is a overvoltage warning display lamp one end of which is connected to another end of the key switch 5; 7 is a over voltage protection circuit and consists of a comparator 701 serving as a first voltage control section for setting a second reference value (Ref2), a comparator 702 serving as a second voltage control section for setting a third reference value (Ref3),a power transistor 704 serving as a second power transistor, a resistance 703 being connected to the base of the second power transistor, diodes 705, 707, 709, 710 for blocking reverse current, a transistor 708 for turning on the over voltage warning display lamp 6, and a base resistance 706.

This overvoltage protection circuit 7 is provided on the positive electrode side of the magnetic field coil 102: the power transistor 704 is disposed between the positive electrode of the magnetic field coil 102 and that of the battery 4.

By virtue of the above arrangement, even when a maltifunction is developed on the negative electrode side of the magnetic field coil 102, the output voltage of the alternating current generator 1 is controlled by the overvoltage protection circuit 7, and therefore, it becomes possible to continue to charge the battery 4 and supply electricity to the electric loads.

Subsequently, a detailed description on the overvoltage protection circuit 7 will be given. The emitter of the power transistor 704 of the overvoltage protection circuit 7 is connected to the output terminal 201 on the positive electrode side of the full wave rectifier 2. The collector of the power transistor 704 is connected to the positive electrode side of the magnetic field coil 102 and to the cathode of the suppression diode 307 and the base of the power transistor 704 is connected to are end of the resistance 703. Another end of the resistance 703 is connected to, the output terminal of the comparator 701 and to the anode of the diode 710. To the reversed input terminal of the comparator 701, the predetermined voltage Ref2 is supplied and the non-reversed input terminals of the comparators 701 and 702 and the reversed input terminal of the comparator 305 are connected to a portion between the resistance 303 and 304. To the cathode of te diode 710, the output terminal of the comparator 702 and the cathode of the diode 705 are connected. The reversed input terminal of the comparator 702 is connected to the anode of the diode 709 and the predetermined voltage Ref3 is supplied to them. The anode of the diode 705 is connected to one end of the resistance 706 and to the anode of the diode 707. Another end of the resistance 706 is connected to a portion between the resistance 301 and the zener diode 302 (connection is not shown) and the voltage from the constant voltage power supply A is applied to that portion so as to limit the electric current flowing to the base (mentioned hereafter). The cathode of the diode 707 is connected to the base of the transistor 708 whose emitter is grounded and whose collector is connected to the cathode of the diode 709 and to another end of the overvoltage warning display lamp 6.

The predetermined voltage Ref1~Ref3 serving as the first through third predetermined values are supplied by dividing the output voltage of the constant voltage power supply A by means of unshown resistances, and when thus supplied voltages become respective predetermined voltages Ref1~3, those voltages are set as threshold voltages for switching the output voltage of the respective comparators 305,701,702 to "High" or "Low".

In this case, since the battery 4 is of 12 V grade, the first and second predetermined voltages Ref1, 2 are the same, they are set to 14.5V. The predetermined voltage Ref3 is set some what higher than the predetermined voltages Ref1, 2 by 1.8V. Also when the 24V grade battery is used, the predetermined voltage Ref3 is set higher by 4.5V. Further, the predetermined voltage Ref3 has, as will be mentioned later, a characteristic feature of being dropped to a lower voltage when an overvoltage is detected.

The constant voltage power supply A is used for power supply for operation of the IC's of the comparators 305, 701 and 702, too.

Subsequently, the operation of the voltage control circuit will be described with reference to FIG. 1 Though the operation of the voltage control circuit 3 is the same as conventional one, the overvoltage protection circuit 7 works at the time when the output voltage rises unusually because the power transistor 308 is shorted or because the negative side of the magnetic field coil 102 is grounded due to entry of an extraneous metal and the like.

This is to say that, when the output voltage of the generator 1 becomes an overvoltage, this overvoltage is divided through resistances 303 and 304 and this divided voltage is compared and detected by the comparator 702 which is set to the third predetermined value (Ref3). Then the comparator 702 outputs "High"; further, the divided voltage through resistances 303 and 304 are inputted to the comparator 701 and compared with the second predetermined value (Ref2) and this comparator 701 outputs "High" and thus the second power transistor 704 is shut off and the magnetic field current of the thus the second predetermined value(Ref2) and this comparator 701 outputs "High" and magnetic field coil 102 decreases. Simultaneously with this, the output of "High" of the comparator 702 puts the diode 705 in the state of being nonconductive. Then, the electric current from the constant voltage power supply A is supplied to the base of the transistor 708 through the resistance 706 and the diode 707 and thus the transistor 708 is put in the state of being turned on bringing the overvoltage warning display lamp 6 to be on.

Then, the diode 709 because conductive became the transistor 708 becomes the state of being turned on, and thus, as mentioned above, the third predetermined valve (predetermined voltage Ref3) is brought to drop to a low voltage and this causes to have the "High" operation of the comparator 702 held and the overvoltage warning lamp 6 is maintained to be turned on. Thereafter, the output voltage of the generator 1 drops and when the output voltage becomes below the second predetermined value (predetermined voltage Ref2), the comparator 701 outputs "Low", the base of the power transistor 704 follows that potential and thus the power transistor 704 becomes conductive.

After that, likewise the operations of the comparator 305 and the power transistor 308, by means of the transistor 701, the power transistor 704 is controlled by turning on and shutting off. Accordingly, the output voltage of the generator 1 is controlled so that the second predetermined value (second predetermined voltage Ref2) is maintained.

The voltage control circuit 3 mentioned as above is stored within the alternating current generator 1 and the overvoltage protection circuit 7 is formed to a separated body from the alternating current generator 1. Usually, the alternating current generator 1 is, as shown by FIG. 2, covered by a rear bracket 1A and a front bracket 1B and respective brackets 1A and 1B are joined by a bolt 11. When installing the generator 1, by aligning the arm sections 1u of respective brackets 1A and 1B to the vehicle frames F1 and F2, the generator 1 is installed in a vehicle.

In this case, the voltage control circuit 3 is formed on a circuit board and the voltage control package 30 storing thus formed circuit 3 within it is provided within the rear bracket 1A. The overvoltage protection circuit 7 is formed on a circuit board and the overvoltage protection circuit package 70 storing thus formed circuit 7 is attached to the vehicle frame F2 by a bolt and the overvoltage protection package 70 is wired to the voltage control package 30 mentioned as above by means of connection harness.

Merits produced by the arrangement as above will be described. The over voltage protection circuit 7 works at the time when an abnormal condition occurs in the alternating current generator 1 or in the voltage control circuit 3; in this situation, if the overvoltage protection circuit 7 is stored within the alternating current generator 1, it is considered that a malfunction will be developed in the over voltage protection circuit 7 too due to the same cause to bringing the voltage control circuit 3 unoperable; this is the case where the side of positive end of the magnetic field coil 102 is, for example, shorted by an extraneous metal and the like.

Further, in the case where both of the voltage control circuit 3 and the overvoltage protection circuit 7 are formed on the same circuit board and in the case where both of the boards, on one of which the voltage control circuit 3 is formed and on another one of which the overvoltage protection circuit 7 is formed, are stored in a single case, it is considered that a malfunction occurs in the overvoltage protection circuit 7 too by the same cause of bringing the voltage control circuit 3 unoperable. For example, the malfunction is supposed to occur due to faulty elements being used or some errors during assembling process.

At this time, if the overvoltage protection circuit 7 is arranged to a separated body, this arrangement as above functions advantageously over such faulty situations. Also, the overvoltage protection circuit 7 can be, as an option, provided afterward.

Further, it is also possible to store the overvoltage protection circuit 7 within the body of the alternating current generator 1 and to arrange the voltage control circuit 3 to form a separated body from the alternating current generator 1. Also, both of the voltage control circuit 3 and the overvoltage protection circuit 7 may be arranged to a separated body from the alternating current generator 1.

Further, a device, which is formed by storing a board with either one of the voltage control circuit or the overvoltage protection circuit formed on it in a case, can be installed and wired in be space within the of the alternating current generator 1.

Further, both of a device, which is formed by storing a board with the voltage control circuit 3 formed on it in a case, and another device, which is formed by storing another board with the overvoltage protection circuit 7 formed on it in another case, can be provided and wired in a space within the body of the alternating current generator 1.

Further, the device, which is formed by storing both of boards, one with voltage control circuit 3 formed on it and another with the overvoltage protection circuit 7 formed on another, stored in a single case, can be installed and wired in a space within the alternating current generator 1.

Further, the device, which is formed by storing a single board with both of the voltage control circuit 3 and the overvoltage protection circuit 7 formed on it in a single case, can be installed and wired in a space within the body of the alternating current generator 1. It is also possible to arrange parts, which likely to get out of order such as power transistors 308 and 704, in a separated body. Embodiment 2.

Figure 3:
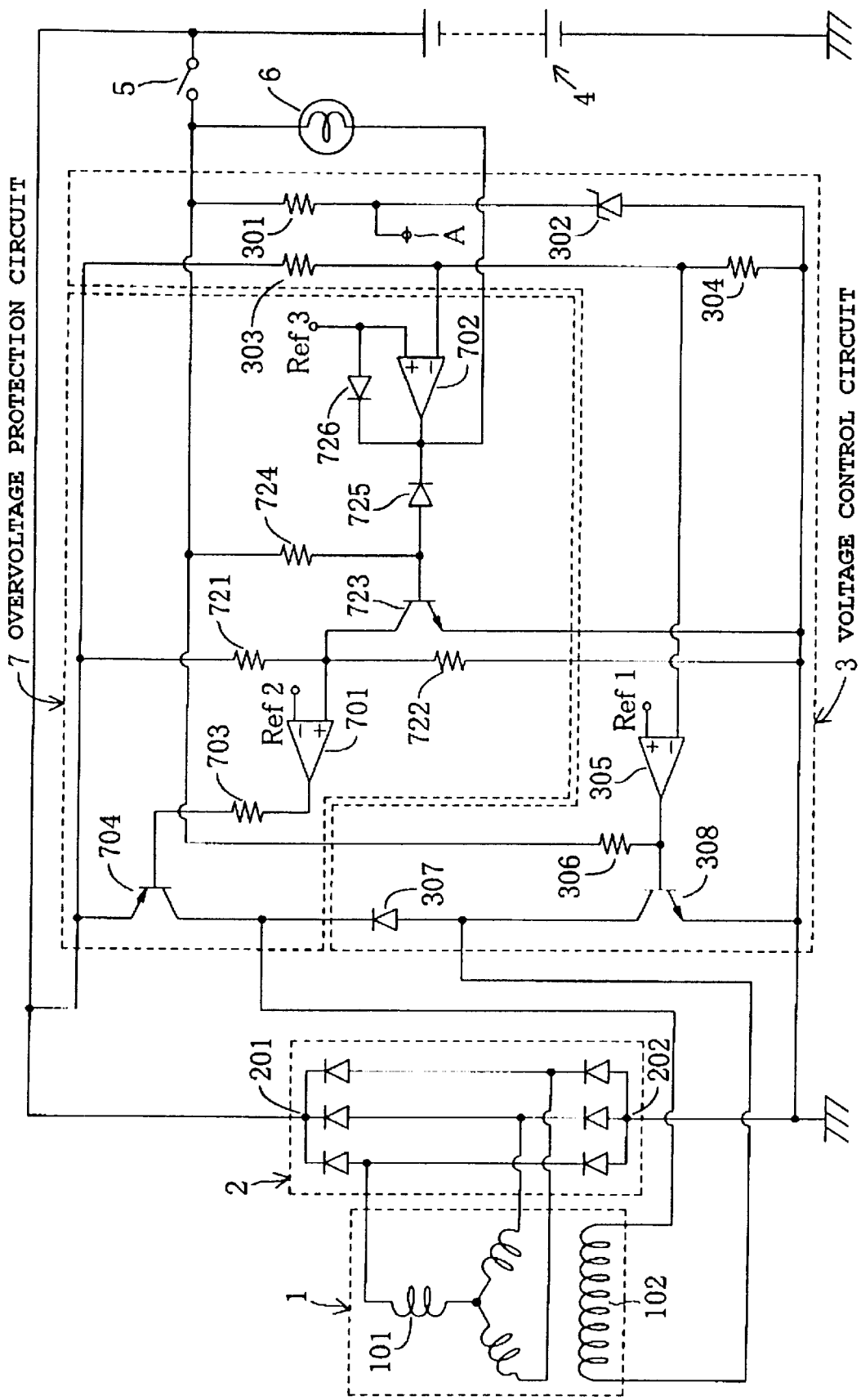
FIG. 3 is a circuit diagram for the control system of the alternating current generator according to Embodiment 2.

In the Embodiment 2, constitution of the overvoltage protection circuit 7 is, as shown by FIG.3, somewhat different from foregoing one.

This is to say that the nonreversed input terminal of the comparator 701 for setting the second predetermined value (Ref2) is connected to a portion between the resistance 721 and 722 and to the collector of the transistor 723, the another end of the resistance 721 is connected to the battery 4, the another end of the resistance 722 is grounded, emitter of the transistor 723 is grounded and its base is connected to one end of the resistance 724 and to the anode of the diode 725, another end of the resistance 724 is connected to another end of the key switch 5, and the cathode of the diode 725 is connected to the cathode of the diode 726, to the output terminal of the comparator 702 and to another end of the over voltage warning display lamp 6.

When the comparator 702 detects an overvoltage exceeding the third predetermined value (Ref3), the power transistor 704 is shut off, having the warning lamp 6 turned on and after that the output voltage is controlled to the second predetermined value (Ref2).

Subsequently, the operation of the overvoltage protection circuit 7, in the case where an overvoltage is produced, will be described.

In this situation, the overvoltage of the generator 1 is divided through the resistances 303 and 304 and, the value of the divided voltage is compared with the third predetermined value (Ref3) by the comparator 702 and then it outputs "Low". This makes the diode 726 conductive, the third predetermined value (Ref3) is brought to be dropped to a lower value, and thus the output of the comparator 702 is held in the state of "Low". Simultaneously with this, by virtue of the output "Low" of the comparator 702, the display lamp 6 is turned on and also the diode 725 becomes conductive and the transistor 723 is turned off. By this function, the output voltage of the alternating current generator 1 is divided trough the resistances 721 and 722.

Thus divided voltage is compared with the second predetermined value (Ref2) by the comparator 701, it outputs "High" and the power transistor 704 is shut off. Then, the magnetic field current of the magnetic field coil 102 is decreased resulting in lowering the output voltage of the generator 1.

When the output voltage of the generator 1 becomes below the second predetermined value (Ref2), the comparator 701 outputs "Low" and the power transistor 704 is made to be conductive. By this operation, output voltage of the generator 1 is controlled to the second predetermined value (Ref2).

After that, likewise the operation in Embodiment 1, control of turn on and shut off of the power transistor 704 is carried out by the comparator 701. Thus, the output voltage of the generator 1 is controlled so that it is held to the second predetermined value (Ref2).

According to the present invention, supposing that the output voltage of the alternating current generator 1 becomes an overvoltage by abnormal rise of it because of being shorted of the power transistor 308 for voltage control due to its breakage or because of being grounded of the negative electrode side of the magnetic field coil 102, the rise of the output voltage is suppressed and thus the vehicle electric loads are prevented from their breakages.

Further, a driver can be notified of an abnormal situation by means of the over voltage warning display lamp 6. After that, since the output voltage is further controlled so that it becomes the second predetermined value, battery charging and electricity supply to the electric loads are normally carried out and as a result, this over voltage protection circuit produces advantage such that a driver can not be influenced by any abnormal situation.

As aforementioned, according to the invention as recited in claim 1, since the overvoltage protection circuit for controlling the output voltage of the alternating current generator is provided on the positive electrode side of the magnetic field coil, even when a malfunction is produced on the positive or negative electrode side of the magnetic field coil, that protection circuit is able to control the output voltage of the alternating current generator and thus operation of battery charging and electricity supply to electric loads can be continued.

According to the invention as recited in claim 2, the voltage control circuit comprises a first power transistor being connected in series with the magnetic field coil on the negative electrode side of the same and for controlling magnetic field current of the magnetic field coil by turning on and turning off the same, and the voltage control circuit controls the first power transistor by detecting the output voltage of the alternating current generator, thereby controls the output voltage of the alternating current generator to a first predetermined value which is a normal value of the output voltage. Therefor, even when a malfunction is produced on the positive electrode side of the magnetic field coil, it is possible to control the output voltage of the alternating current generator to the first predetermined value.

According to the invention as recited in claim 3, the overvoltage protection circuit comprises a second power transistor being connected in series with the magnetic field coil on its positive electrode side for controlling magnetic field current of the magnetic field coil by turning on and turning off the current, a first voltage control section which works so as to control the output voltage to a second predetermined value by controlling the second power transistor through detection of the output voltage of the alternating current generator, and a second voltage control section which works so as to shut off the second power transistor when the output voltage exceeds a third value being set higher than the first and second values.

Therefore, even when a malfunction is produced on the negative electrode side of the magnetic field coil, it is possible to control the output voltage of the alternating current generator to the second predetermined value.

According to the invention as recited in claim 4, the overvoltage protection circuit turns on an overvoltage warning lamp when the second voltage control section is operated caused by said output voltage of the alternating current generator exceeding over the third predetermined value.

Therefore, a driver can surely recognize overvoltage of the battery and malfunction of the control system.

According to the invention as recited in claim 5, since the voltage control circuit is installed within body of the alternating current generator, harness for connection is not required and also a space for installation to vehicle is not required.

According to the invention as recited in claim 6, since the overvoltage protection circuit is installed within body of the alternating current generator, harness for connection is not required and also space for installation vehicle is not required.

According to the invention as recited in claim 7, since the voltage control circuit is arranged to be formed to a separated body from the alternating current generator, repair and exchange parts at the of time of malfunction can be carried out easily.

According to the invention as recited in claim 8, the overvoltage protection circuit is arranged to be formed to a separated body form the alternating current generator. Therefore, the overvoltage protection circuit is put under a condition of being isolated with respect to location and process of manufacturing from source of overvoltage such as entry of an extraneous metal and defective manufacturing and thus reliability can be improved.

According to the invention as recited in claim 9, since the second predetermined value is the same with the first predetermined value, the regular electricity supply can be performed without being accompanied with charging voltage change to the battery.

According to the invention as recited in claim 10, since the third predetermined value is set higher by 1.8V for battery of 12V grade with respect to the first predetermined value and is set higher by 4.5V for battery of 24V grade with respect to the same, the overvoltage can be surely detected.

What is claimed is:

1. A control system for an alternating current generator for charging a battery and comprising a magnetic field coil, generator coils and a voltage control circuit for controlling output voltage of said alternating current generator and being provided on the negative electrode side of said magnetic field coil, wherein an overvoltage protection circuit for controlling said output voltage of said alternating current generator is provided on the positive electrode side of said magnetic field coil.

2. A control system for an alternating current generator according to claim 1, wherein said voltage control circuit comprises a first power transistor for controlling magnetic field current by turning on and turning off the same and being connected in series with said magnetic field coil on the negative electrode side of said magnetic field coil, said voltage control circuit controls said first power transistor by detecting said output voltage of said alternating current generator, thereby controls said output voltage to a first predetermined value which is a normal value of said output voltage.

3. A control system for an alternating current generator according to claim 2, wherein said overvoltage protection circuit comprises a second power transistor for controlling magnetic field current by turning on and turning off the same and being connected in series with said magnetic field coil on its positive electrode side, a first voltage control section which works so as to control said output voltage to a second predetermined value by controlling said second power transistor through detection of said output voltage of said alternating current generator, and a second voltage control section which works so as to shut off said second power transistor when said output voltage exceeds a third predetermined value being set higher than said first and second predetermined values.

4. A control system for an alternating current according to claim 3, wherein said overvoltage protection circuit turns on an overvoltage warning lamp when said second voltage control section is operated caused by said output voltage of said alternating current generator exceeding over said third predetermined value.

5. A control system for an alternating current generator according to claim 2, wherein said voltage control circuit is installed within body of said alternating current generator.

6. A control system for an alternating current generator according to claim 3, wherein said overvoltage protection circuit is installed within body of said alternating current generator.

7. A control system for an alternating current generator according to claim 2, wherein said voltage control circuit is arranged to be formed to a separated body from said alternating current generator.

8. A control system for an alternating current generator according to claim 3, wherein said overvoltage protection circuit is arranged to be formed to a separated body from said alternating current generator.

9. A control system for an alternating current generator according to claim 3, wherein said second predetermined value is the same with said first predetermined value.

10. A control system for an alternating current generator according to claim 3, wherein said third predetermined value is set higher by 1.8V for battery of 12V grade with respect to said first predetermined value and is set higher by 4.5V for battery of 24V grade with respect to the same.

* * * * *